United States Patent [19]
Isogai et al.

[11] Patent Number: 4,634,226
[45] Date of Patent: Jan. 6, 1987

[54] OPTICAL APPARATUS USING FERROELECTRIC LIQUID CRYSTAL AND SWITCHING UNIT FOR EMITTED LIGHT

[75] Inventors: Masato Isogai; Shintaroo Hattori, both of Hitachi; Kishiro Iwaskai, Hitachiota; Akio Mukoh, Mito; Takao Umeda; Yoshiharu Nagae, both of Hitachi, all of Japan

[73] Assignee: Hitachi, Ltd., Tokyo, Japan

[21] Appl. No.: 597,746

[22] Filed: Apr. 6, 1984

[30] Foreign Application Priority Data

Apr. 8, 1983 [JP] Japan ................ 58-60826

[51] Int. Cl.⁴ .................................... G02F 1/13
[52] U.S. Cl. .................... 350/332; 350/350 S
[58] Field of Search .................. 350/332, 350 S

[56] References Cited

U.S. PATENT DOCUMENTS

| | | | |
|---|---|---|---|
| 3,891,981 | 6/1975 | Torresi | 350/332 X |
| 4,356,483 | 10/1982 | Fujita et al. | 350/332 X |
| 4,508,429 | 4/1985 | Nagae et al. | 350/350 S |
| 4,548,476 | 10/1985 | Kaneko | 350/350 S |

Primary Examiner—John K. Corbin
Assistant Examiner—Richard F. Gallivan
Attorney, Agent, or Firm—Antonelli, Terry & Wands

[57] ABSTRACT

An optical apparatus comprises an optical device having an optically functional material sandwiched between a pair of substrates with electrodes formed on opposing surfaces. The optically functional material has such a characteristic that intensity of light issuing from the optical device changes asymmetrically in response to inversion of the polarity of an applied external field. Pulse voltages of one polarity for determining the intensity of the issuing light and pulse voltages of an opposite polarity are applied from a source at a predetermined period so that an average voltage is zeroed within the predetermied period. The issuing light intensity under the application of the pulse voltages of one polarity and the issuing light intensity under the application of the other pulse voltages are selected or changed by a switching unit.

25 Claims, 25 Drawing Figures

(a) (b) (c)

(a)

(b)

(a)

(b)

(a)

(b)

(a)

(b)

(a)

(b)

(a)

(b)

(a)

(b)

(a)

(b)

F I G. 22
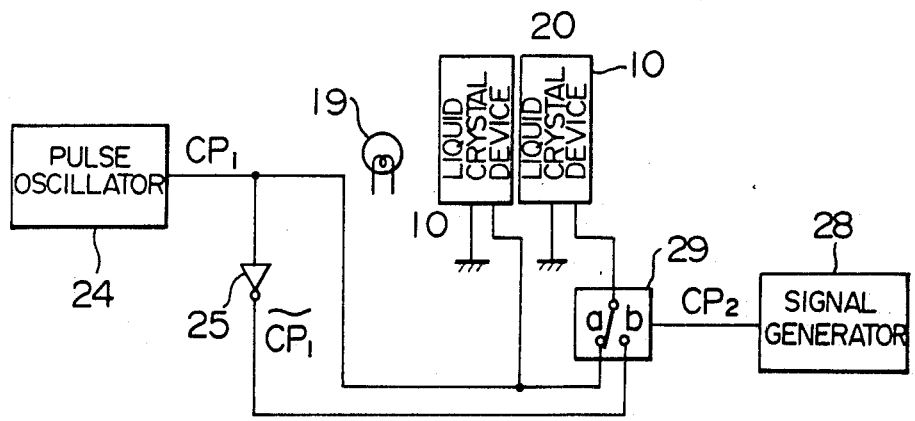
F I G. 23
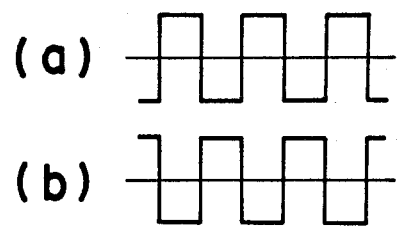
F I G. 24
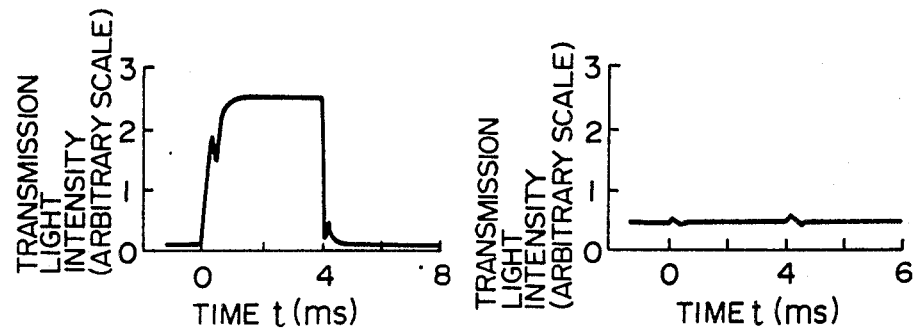

OPTICAL APPARATUS USING FERROELECTRIC LIQUID CRYSTAL AND SWITCHING UNIT FOR EMITTED LIGHT

BACKGROUND OF THE INVENTION

This invention relates to an optical apparatus and more particularly to an optical apparatus having a good response characteristic and being suitable for use as a display apparatus or an optical switch.

As an optical device with an excellent response characteristic, a device utilizing optically functional material such as a ferroelectric liquid crystal device has recently been highlighted. However, any report on an AC-drive optical device of this type has not yet been announced. This is because this type of optically functional material exhibits a specific change in intensity of transmitted (or reflected) light and the intensity of light emitted from an optical device is reversed in magnitude in response to inversion of the polarity of an external field applied to the optically functional material. Under application of voltage in the AC-drive (which, strictly speaking, zeroes the DC component), the intensity of transmitted light (reflected light) is strengthened (or weakened) in response to positive polarity and conversely weakened (or strengthened) in response to negative polarity, so as to be averaged eventually. In other words, the intensity of transmitted light (reflected light) under the application of voltage (intermediate intensity due to the positive and negative polarity responses) becomes almost indistinctive from the intensity in the absence of the applied voltage.

For example, European Patent Application No. 0032362 discloses an optical apparatus utilizing ferroelectric liquid crystal but it is undesirable to drive such a ferroelectric liquid crystal device with DC. This is because an ion flow caused by DC-drive in a liquid crystal layer creates an electrochemical reaction which deteriorates the liquid crystal and in addition, the alignment control layer for aligning liquid crystal molecules is damaged for unknown reasons.

For the reasons set forth above, the advent of a practical optical apparatus has been desired which utilizes optically functional material having such a characteristic that the intensity of light emitted from an optical device changes asymmetrically in response to inversion of the polarity of an applied external field.

An object of this invention is to provide an optical apparatus which can provide high contrast under AC-drive irrespective of the fact that optically functional material used in the apparatus has such a characteristic that the intensity of light emitted from an optical device (radiant light intensity) is reversed in magnitude in response to inversion of the polarity of an external field applied to the optically functional material.

SUMMARY OF THE INVENTION

This invention has a feature of an AC-drive optical device having specific optically functional material sandwiched between a pair of substrates provided with electrodes on opposing surfaces.

(Fundamental Structure of Optical Device)

The optical device according to this invention has a structure wherein specific optically functional material is sandwiched between a pair of substrate provided with electrodes on opposing surfaces. The optically functional material may not be directly sandwiched between the electrode substrates but it may be indirectly sandwiched through, for example, ground layers, insulating layers, alignment control layers, proton supply layers or the like. At least one of the substrates is preferably transparent but its transparency should not be construed as limitative as far as it permits transmission of light to same extent. The present invention is applicable to both of reflection and transmission types. The optical device may be of a multi-layer structure (wherein three or more electrode substrates are laminated) as exemplified in an embodiment to be described later. For sealing, peripheral edges of the substrates are directly bonded together or alternatively, they may be indirectly bonded together through a bonding agent such as organic adhesives or glass frit. Glass or plastics may selectively be used as material of the substrate per se, as desired. Provision of polarizing function to the substrate itself or addition of a polarizer to the substrate may fall in the scope of the present invention.

(Optically Functional Material in the Invention)

The optically functional material according to this invention is quite different from nematic liquid crystal in nature. More particularly, the optically functional material has such a characteristic that the intensity of transmitted light (reflected light) emitted from the optical device is reversed in magnitude in response to inversion of the polarity of an external field applied. This optically functional material with such a characteristic includes electrochromic materials and ferroelectric liquid crystals. The ferroelectric liquid crystal has a common name called chiral smectic liquid crystal and is the newest material in the field of liquid crystal technology. The optically functional material may be used by itself or alternatively, if may contain a pleochroic dye, an optically active material or the like without departing from the scope of the present invention.

(AC-drive and First Means)

First means of the present invention constitutes means for applying AC of the device. "AC" herein is defined as designating alternating currents which provide two types of voltages termed pulse voltages and voltage signals, whereby the pulse voltages are applied to the optically functional material at a predetermined period to determine the intensity of light emitted from the optical device while the voltage signals of the polarity opposite to that of the pulse voltages being applied to the optically functional material so that a voltage average value within the predetermined period is zeroed (or the DC component is zeroed). In other words, the voltage signal has a DC component which is opposite to the pulse voltage in polarity but is equal to the pulse voltage in absolute value.

Assuming that the pulse voltage is called a first pulse voltage, the voltage signal is a second pulse voltage and in a first example (hereafter called a first system of the present invention), the second pulse voltage has the same pulse width as that of the first pulse voltage and a pulse height which is equal to that of the first pulse voltage in absolute value but is opposite to the first pulse voltage in polarity. In a second example (hereafter called a second system of the present invention), the voltage signal (or the second pulse voltage) has a sufficiently high (or low) pulse height and conversely a sufficiently short (or long) pulse width (voltage application time interval), as compared to those of the first pulse voltage. Further, the pulse height of the voltage signal is smaller than a threshold voltage of the ferroelectric liquid crystal.

(Light Intensity Switching and Second Means)

Since, in accordance with the first and second systems of the present invention, contrast cannot be obtained with a simple AC-drive (reasons thereof have already been explained above in connection with the first system), it is of significance to provide means for switching the light intensity so as to determine bright or dark state (including intermediate state subject to gradation) and second means functions to this end.

For example, the second means is a chopper disposed, on a path along which light passing through the optical device travels, to intermittently block the light. It is effective to synchronize the intermittent blocking of light with the application of the pulse voltages. Switching of light intensity is not limited for switching bright and dark binary states but it may also be effected for a so-called tonal display. As one example, the chopper acts to synchronize the application of the first pulse voltage with the passage of light to bring transmitted light (reflected light) into a bright state and on the other hand, it acts to synchronize the application of the first pulse voltage with the optical path blocking to bring transmitted light (reflected light) into a dark state, thereby assuring switchover between the bright and dark states. As another example, the chopper acts to synchronize the timing for the application of the first pulse voltage with the timing for the passage of light such that these timings partly overlap, thereby assuring a tonal function. Since the chopper suffices by having such functions as above, it may be, for example, a pleochroic ferroelectric liquid crystal device or a rotary member formed with light transmitting parts. Such a chopper fulfils itself particularly in the first system of the present invention. And besides the chopper does not necessarily have to be located on the same side of the device as a light source.

In the second system of the present invention, on the other hand, the provision of the chopper is not always necessary and, for example, means for inverting the polarity of the pulse voltage or means for switching the polarizing axis direction of a polarizing plate can effectively serve as the second means. In addition, the pulse height of the pulse voltage may be changed to provide a tonal display.

BRIEF DESCRIPTION OF THE DRAWING FIGURES

The above and other objects, features and advantages of the present invention will be apparent from the following detailed description of the preferred embodiments of the invention in conjunction with the accompanying drawings, in which:

FIGS. 7, 10, 11, 12, 13, 19, 21 and 24 are driving waveforms in embodiments of optical device according to the present invention;

FIGS. 14 and 22 are schematic diagrams showing the construction of embodiments of the optical device according to the present invention;

FIG. 23 is a diagram illustrative of pulse voltages used in the embodiment of FIG. 22.

DETAILED DESCRIPTION OF THE PREFERRED EMBODIMENTS

The invention will now be described by way of examples with reference to the accompanying drawings. Optically functional materials used in embodiments to be described hereinafter are selected from various kinds of ferroelectric liquid crystal listed in Table 1.

TABLE 1

(n: integer)

$$C_nH_{2n+1}O-\bigcirc-CH=N-\bigcirc-CH=CH\overset{O}{\underset{\|}{C}}OCH_2\overset{CH_3}{\underset{|*}{C}}HC_2H_5$$

| Examples | |
|---|---|
| n = 14 | TDOBAMBC |
| n = 12 | DDOBAMBC |
| n = 10 | DOBAMBC |
| n = 8 | OOBAMBC |
| n = 6 | HOBAMBC |

$$C_nH_{2n+1}O-\bigcirc-CH=N-\bigcirc-CH=CH\overset{O}{\underset{\|}{C}}OCH_2\overset{H}{\underset{|*}{C}}CCH_3\atop{\underset{Cl}{|}}$$

| Examples | |
|---|---|
| n = 6 | HOBACPC |
| n = 8 | OOBACPC |
| n = 10 | OOBACPC |

$$C_nH_{2n+1}O-\bigcirc-CH=N-\bigcirc-CH=\overset{Cl}{\underset{|}{C}}-\overset{O}{\underset{\|}{C}}OCH_2\overset{CH_3}{\underset{|*}{C}}HC_2H_5$$

| Example | |
|---|---|
| n = 8 | OOBAMBCC |

$$C_nH_{2n+1}O-\bigcirc-CH=N-\bigcirc-CH=\overset{N\equiv C}{\underset{|}{C}}-\overset{CH_3}{\underset{|*}{C}}OCH_2\overset{}{\underset{\|}{C}}HC_2H_5\atop{\underset{O}{\|}}$$

TABLE 1-continued

| Example | |
|---|---|
| n = 10 | DOBAMBCC |

$$C_nH_{2n+1}O-\bigcirc-CH=N-\bigcirc-CH=\overset{N\equiv C}{\underset{|}{C}}CH_2\overset{CH_3}{\underset{|}{CH}}C_2H_5$$

| Example | |
|---|---|
| n = 14 | TDOBAMBCC |

Figure 1:
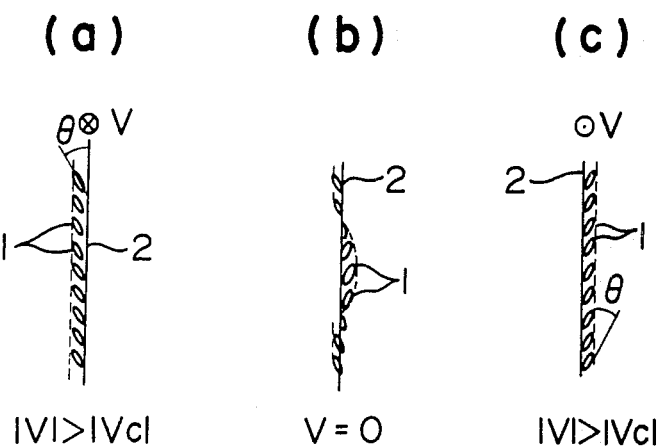
FIG. 1 is a diagram showing states assumed by ferroelectric liquid crystal in accordance with the applied electric field.

Molecules of these ferroelectric liquid crystals are oriented under the application of an electric field as shown in FIG. 1.

Without the application of an electric field E, as shown in FIG. 1(b), ferroelectric liquid crystal molecules 1 are helically oriented, making an angle $\theta$ (for example, 20° to 25° for DOBAMBC) with respect to a helical axis 2.

When an electric field V in excess of a threshold electric field Vc is applied to the thus oriented ferroelectric liquid crystal molecules 1, these ferroelectric liquid crystal molecules 1 are oriented on a plane vertical to the direction of the electric field V making an angle $\theta$ with respect to the helical axis 2, as shown in FIG. 1(a). With the polarity of the field V of FIG. 1(a) inverted, the ferroelectric liquid crystal molecules 1 are oriented on the plane vertical to the direction of the field V making an angle $\theta$ with respect to the helical axis 2, as shown in FIG. 1(c).

As well known in the art, the above switching of orientation proceeds at a very high speed and is responsive to a voltage pulse having a pulse width of the order of microseconds under the application of an electric field of a sufficient magnitude, thus promising applications to devices incorporating a great number of picture elements such as a large-sized display, an optical shutter, an polarizer and the like. However, in the past, the relation between the applied voltage and the light transmission state has not been clarified and it has not been clear what type of voltage should specifically be applied to the ferroelectric liquid crystal to drive it.

Figure 2:
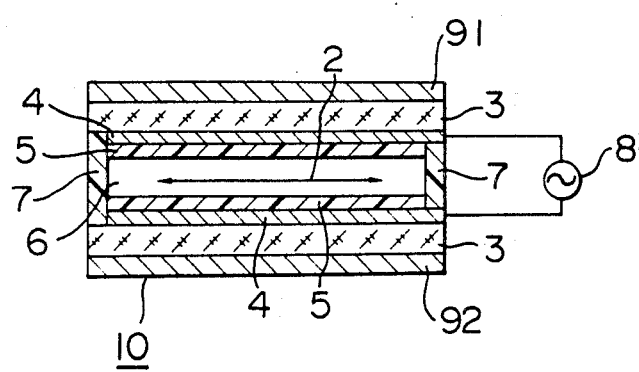
FIGS. 2 and 20 are sectional views showing embodiments of liquid crystal device to which the present invention is applicable.

As shown in FIG. 2, display electrodes 4 made of $In_2O_3$, $SnO_2$ or a mixture thereof are formed to be a thickness of 500 to 1000 Å on opposing surfaces of a pair of substrates 3 made of glass or plastics. Alignment control layers 5 made of organic resin (for example polyimid-iso-indolylquinazolinedione layers) or $SiO_2$ are formed to be a thickness of 100 to 1000 Å on the electrodes 4, as desired. A ferroelectric liquid crystal layer 6 at 73° to 93° C. is sandwiched in a gap (about 10 $\mu$m) between the substrates 3. In this embodiment, the ferroelectric liquid crystal is p-decyloxybenzylidene-p'-amino-2-methylbutyl cinnamate (commonly termed DOBAMBC). A sealing agent 7 is applied to seal the ferroelectric liquid crystal layer 6, and an AC power supply is designated by a reference numeral 8. In this case, the alignment control layers 5 are so constructed as to make a helical axis 2 of ferroelectric liquid crystal molecules substantially parallel to each of the substrates 3. In addition, there are provided polarizing plates 91 and 92 adjacent to surfaces of the respective substrates 3 on which the respective display electrodes 4 are not formed, thus completing a liquid crystal device 10.

Figure 3:
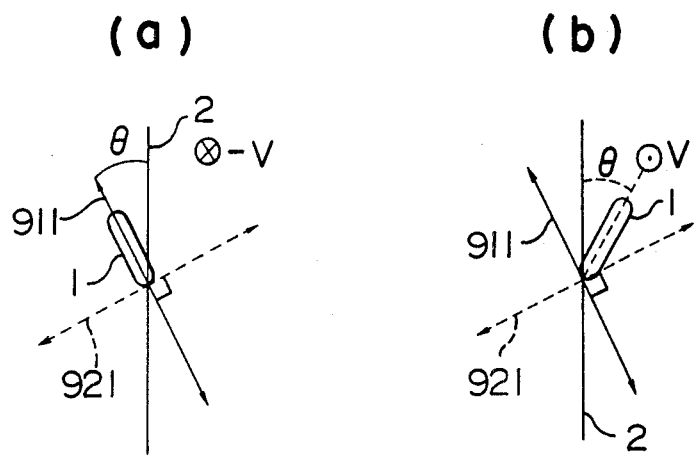
FIG. 3 is a diagram illustrative of the relation between the helical axis direction of ferroelectric liquid crystal molecules and the polarizing axis directions of polarizing plates.

In this case, as shown in FIG. 3, a polarizing axis direction 911 of the polarizing plate 91 is made substantially orthogonal to a polarizing axis direction 921 of the polarizing plate 92, and the polarizing axis direction of one polarizing plate is made substantially coincident with the alignment direction of the ferroelectric liquid crystal molecules 1 when the electric field in excess of the threshold electric field |Vc| of the ferroelectric liquid crystal is applied. In FIG. 3, the polarizing axis direction 911 of the polarizing plate 91 coincides with the direction of the helical axis 2 when the electric field is applied in a direction passing through the sheet of drawing from front to rear. In the following description, the field in this direction will be represented by negativity −V and the liquid crystal device with a construction shown in FIG. 2 will be taken for instance, but the present invention is in no way limited thereto. For example, the invention may also be applicable to a construction wherein, in FIG. 2, a reflecting plate substituting for the polarizing plate 92 may be provided adjacent to the substrate 3 and the ferroelectric liquid crystal layer 6 may be mixed with a dichroic dye. In this case, most preferably, the ferroelectric liquid crystal molecules 1 make an angle $\theta$ of 45° with respect to the helical axis 2.

Under the application of the −V electric field as shown in FIG. 3(a), incoming light (natural light) from front of the sheet of drawing is polarized in the polarizing axis direction 911 of the upper polarizing plate 91 to be converted into linearly polarized light having an oscillatory component only in a major axis direction of the ferroelectric liquid crystal molecules 1. The linearly polarized light is affected by a refractive index $n_{//}$ in the major axis direction so as to pass through the ferroelectric liquid crystal layer 6.

Therefore, the linearly polarized light incident on the lower polarizing plate 92 is blocked thereby since the polarizing axis direction 921 of this polarizing plate 92 is orthogonal to the polarizing axis direction 911 of the polarizing plate 91 thereby providing a dark display.

Under the application of +V electric field as shown in FIG. 3(b), the major axis of the ferroelectric liquid crystal molecules 1 is oriented to a direction which does not coincide with both the polarizing axis directions 911 and 921 of the upper and lower polarizing plates 91 and 92. In this case, the linearly polarized light from the upper polarizing plate 91 is resolved into one component in the major axis direction of the ferroelectric liquid crystal molecules 1 which is affected by the refractive index $n_{/}$ in the major axis direction and the other component in a minor axis direction which is subject to a refractive index $n\perp$ in the minor axis direction, so as to pass through the ferroelectric liquid crystal layer 6. As a result, the light emitted from the ferroelectric liquid crystal layer 6 takes the form of elliptically polarized light having a component which can pass through the lower polarizing plate 92, thereby providing a bright display.

In this manner, bright and dark displays can be switched by applying the +V and −V fields to thereby provide functions of a display device, an optical shutter and a polarization device. In the absence of the applied electric field, a display of substantially intermediate brightness can be obtained. The phenomena described hereinbefore are called electrooptic effects herein.

Figure 4:
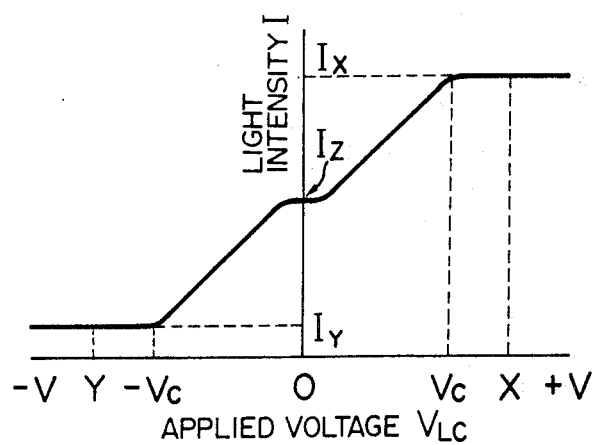
FIGS. 4 and 16 are diagrams showing light transmission characteristics of the ferroelectric liquid crystal.

The electrooptic effects were studied in detail to find a characteristic as shown in FIG. 4.

More particularly, as a voltage $V_{LC}$ applied to the ferroelectric liquid crystal increases from zero, light intensity I (hereinafter corresponding to transmitting light intensity for the transmission type device and reflected light intensity for the reflection type device) increases until it takes a constant value when the applied voltage $V_{LC}$ exceeds a threshold voltage $+Vc$. As the applied voltage $V_{LC}$ increases in the negative direction, the light intensity I decreases until it is saturated when the applied voltage $V_{LC}$ exceeds a threshold voltage $-Vc$. For the applied voltage being X, the light intensity becomes Ix and for the applied voltage being Y, the light intensity becomes Iy. Since an AC voltage applied reciprocates between X and Y, the values Ix and Iy of the light intensity are averaged into Iz which is equal to a value of light intensity when the applied voltage is zero. Therefore, unless any expedient is employed, the light intensity (brightness) in the presence of the applied voltage is indistinctive from the light intensity in the absence of the applied voltage, failing to provide contrast.

Figure 5:
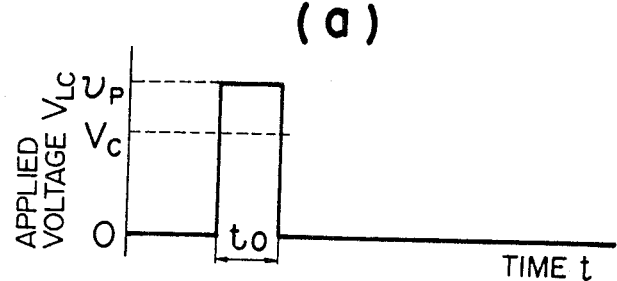
FIG. 5 is a diagram illustrative of light transmission states responsive to pulse voltage $v_p$ of the ferroelectric liquid crystal to which the present invention is applicable.
Figure 5:
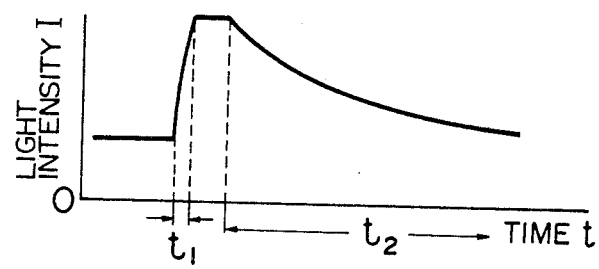
Figure 5:
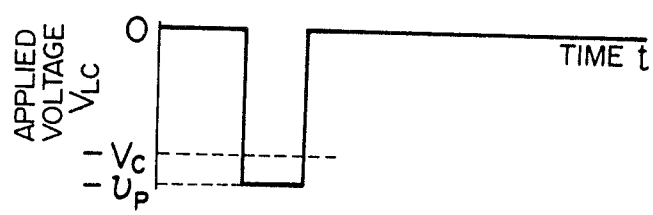
Figure 5:
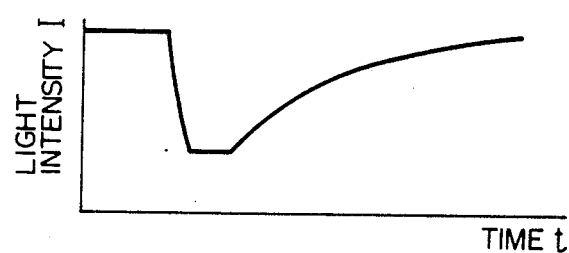

In order to examine the response of light intensity to a pulse voltage $v_p$, a positive voltage pulse $v_p$ having a pulse height which is higher than the threshold voltage Vc as shown in FIG. 5(a) was applied to the ferroelectric liquid crystal. As a result, it was found that, as shown in the figure, light intensity I increased abruptly within a short rise time $t_1$ in response to the application of the pulse voltage $v_p$ and recovery time $t_2$ after the application of the pulse voltage $v_p$ was long as shown in FIG. 5(a).

For example, when a pulse voltage $v_p$ having a higher pulse height than a threshold voltage (5 to 10 V) and a pulse width to of 500 µs was applied to the ferroelectric liquid crystal, it was proven by inventors of the present application that $t_1$ was 120 µs and $t_2$ was 8 ms.

Under the application of a negative pulse voltage $-v$, a response after disappearance of the pulse voltage was retarded as compared to a response upon the application of the pulse voltage and a prolonged recovery time took place, as shown in FIG. 5(b).

Figure 6:
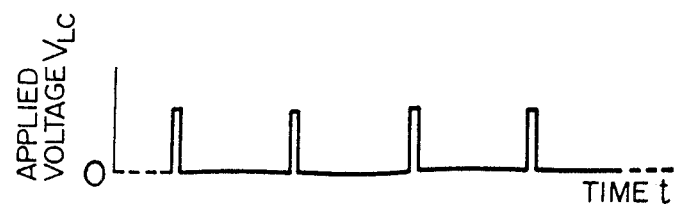
FIG. 6 is a diagram illustrative of light transmission states responsive to pulse voltage trains.
Figure 6:
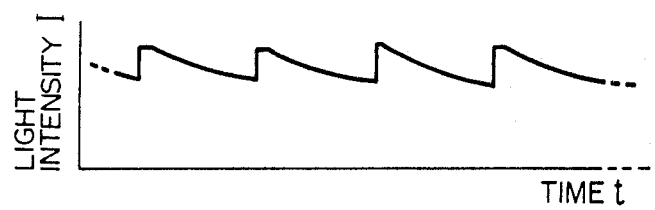
Figure 6:
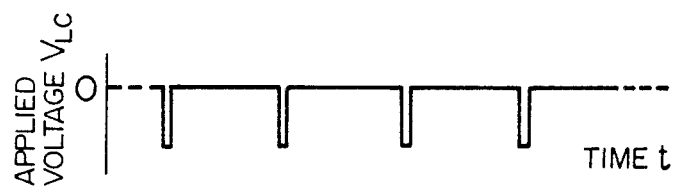
Figure 6:
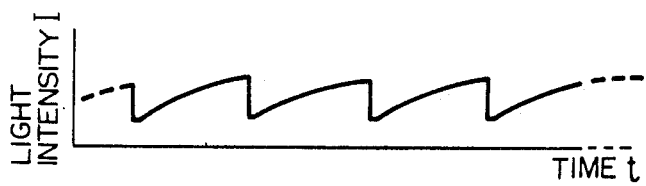

In the case of application of a pulse voltage train as shown in FIG. 6, a difference in average brightness occurs between the application of a train of positive pulse voltages as shown in FIG. 6(a) and the application of negative pulse voltages as shown in FIG. 6(b), thereby making it possible to provide binary states of bright and dark light transmission.

With this method, in order to obtain displays of high quality, flicker in the display is required to be eliminated and hence the repetition period of the pulse voltages applied to the ferroelectric liquid crystal must be 30 ms or less.

According to this driving method, the voltage $V_{LC}$ applied to the ferroelectric liquid crystal contains a DC component unless the time for bright displays is equal to the time for dark dispalys.

In the extreme, segments being under bright displays are always supplied with a positive DC component whereas segments being under dark displays are always supplied with a negative DC component.

Since, as well known in the art, the liquid crystal device being driven under the application of the DC component undergoes an electrochemical reaction which aggravates deterioration of the device and reduces life thereof, the method shown in FIG. 6 is seriously defective because of the deterioration of the device.

Figure 7:
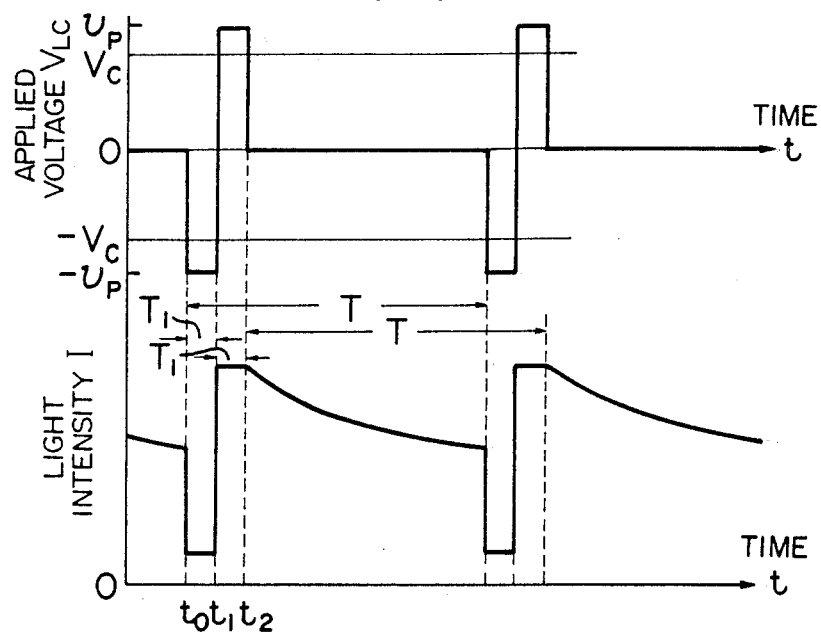
Figure 7:
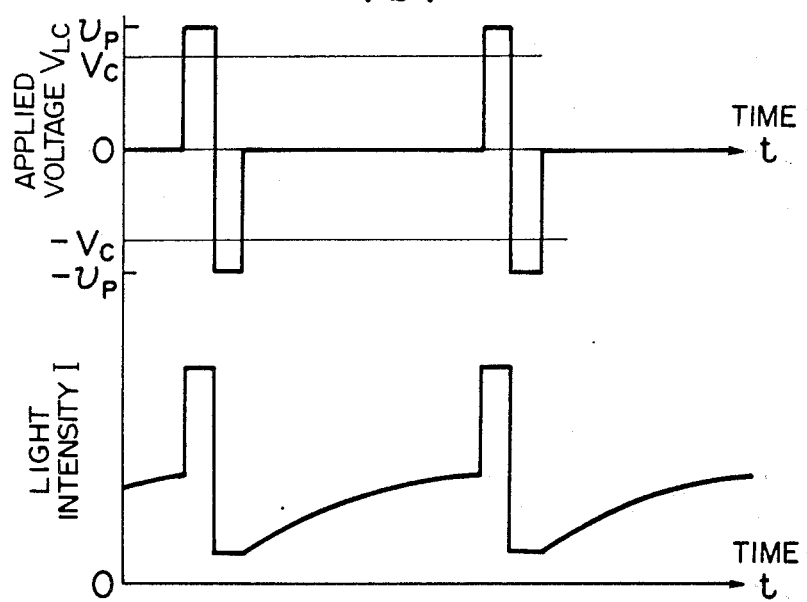

FIG. 7 shows drive waveforms illustrative of a first embodiment according to the present invention, wherein a pulse voltage $-v_p$ is applied immediately before the pulse voltage $v_p$ shown in FIG. 6, the pulse voltage $-v_p$ having a polarity opposite to that of the pulse voltage $v_p$ and the same pulse width and pulse height as, those of the pulse voltage $v_p$.

FIG. 7(a) shows a voltage $V_{LC}$ applied to the ferroelectric liquid crystal when the display device displays a bright display by transmitting incident light through the device, in relation to light transmission state (light intensity I) of the device shown in FIG. 2. FIG. 7(b) shows the relation between a voltage $V_{LC}$ applied when the display device displays a dark display by blocking incident light, and the light intensity I.

Referring to FIG. 7(a), when a negative pulse voltage having a pulse height $-v_p$ of 5 to 20 V and a pulse width $T_1$ of 500 to 100 µs is applied at time $t_0$, the display once becomes dark. Thereafter, when a positive pulse voltage having a pulse height $v_p$ and the pulse width $T_1$ is applied at time $t_1$, the display becomes bright abruptly. subsequently, when the applied voltage becomes zero at time $t_2$, the display gradually decreases in brightness. By repeating the above operation at a predetermined period T of 1 to 30 ms which can prevent occurrence of flicker, average brightness can be obtained which is sufficiently high.

Thus, in this embodiment, the ferroelectric liquid crystal is supplied, within the predetermined period T, with the pulse voltage having the opposite polarity to and the same absolute value as those of the pulse voltage $v_p$ which determines the light transmission state, so that the voltage applied to the ferroelectric liquid crystal is zeroed in average to eliminate the DC component and the deterioration of the ferroelectric liquid crystal due to the electrochemical reaction can be prevented.

Further, since in this embodiment, the pulse voltage $-v_p$ having the same pulse width and absolute value of pulse height and the opposite polarity is applied immediately before the pulse voltage $v_p$ determining the light transmission state is applied, incident light can be blocked by simply inverting the polarity of the pulse voltages as shown in FIG. 7(b).

Figure 8:
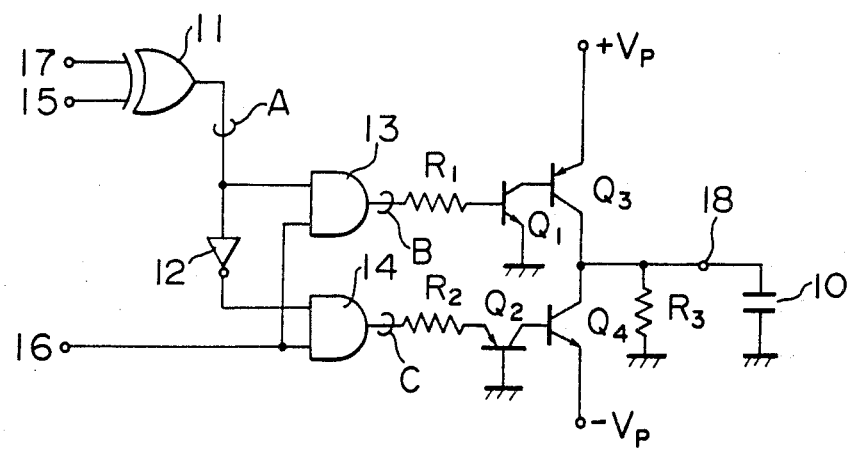
FIG. 8 is a circuit diagram for implementing the driving waveforms shown in FIG. 7.

FIG. 8 shows an example of specified circuits for implementing the driving waveforms shown in FIG. 7.

Referring to FIG. 8, there are illustrated an exclusive "or" gate 11, an inverter 12, "and" gates 13 and 14, switching transistors $Q_1$, $Q_2$, $Q_3$ and $Q_4$, resistors $R_1$, $R_2$ and $R_3$, input terminals 15, 16 and 17, an output terminal 18, portions A, B and C at which pulses are measured for observation, and a liquid crystal device 10 connected to the output terminal.

Figure 9:
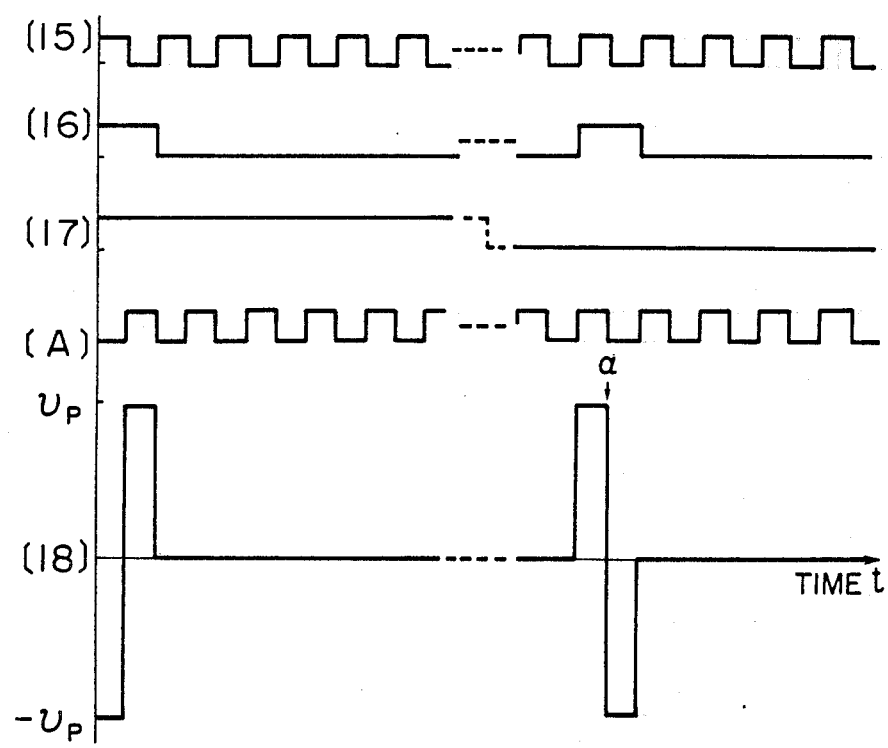
FIG. 9 is a timing chart of signals in the circuit shown in FIG. 8.

In the circuit of FIG. 8, signal waveforms as shown in FIG. 9 occur at timings as described in Table 2.

A symbol [15] denotes a signal applied to the input terminal 15 to determine the pulse width, a symbol [16] denotes a signal applied to the input terminal 16 to determine the timing for producing the pulse voltages, and a symbol [17] denotes a signal applied to the input terminal 17 to determine the phase of an output voltage [18]. Bright and dark light transmission states can be switched by controlling the signal [17]. A bright state occurs before the output voltage [18] reaches α and thereafter, a dark state occurs.

TABLE 2

| [15] | [16] | [17] | [A] | [B] | [C] | Output voltage [18] |
|---|---|---|---|---|---|---|
| 0 | 0 | 0 | 0 | 0 | 0 | 0 |
| 0 | 1 | 0 | 0 | 0 | 1 | $-v_p$ |
| 1 | 0 | 0 | 1 | 0 | 0 | 0 |
| 1 | 1 | 0 | 1 | 1 | 0 | $+v_p$ |
| 0 | 0 | 1 | 1 | 0 | 0 | 0 |

TABLE 2-continued

| [15] | [16] | [17] | [A] | [B] | [C] | Output voltage [18] |
|---|---|---|---|---|---|---|
| 0 | 1 | 1 | 1 | 1 | 0 | $+v_p$ |
| 1 | 0 | 1 | 0 | 0 | 0 | 0 |
| 1 | 1 | 1 | 0 | 0 | 1 | $-v_p$ |

Figure 10:
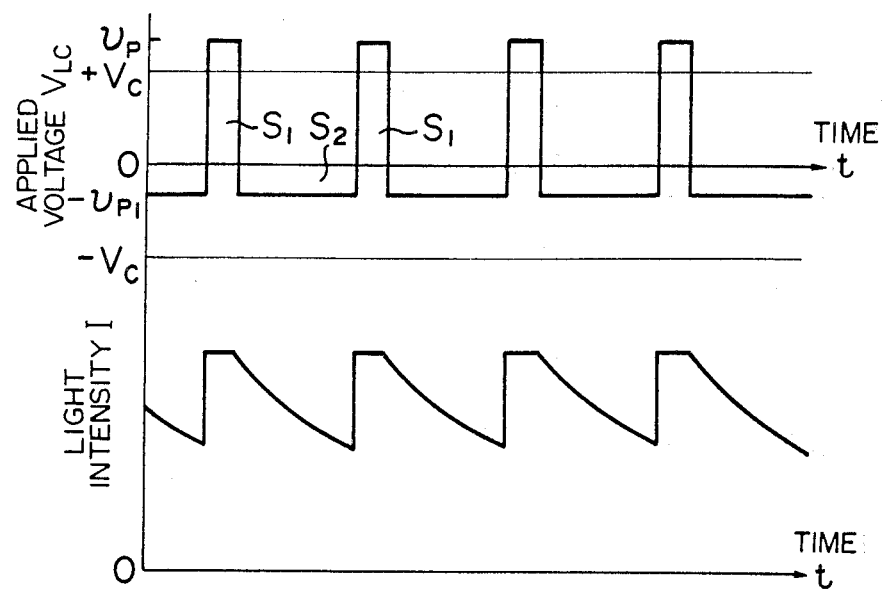
Figure 10:
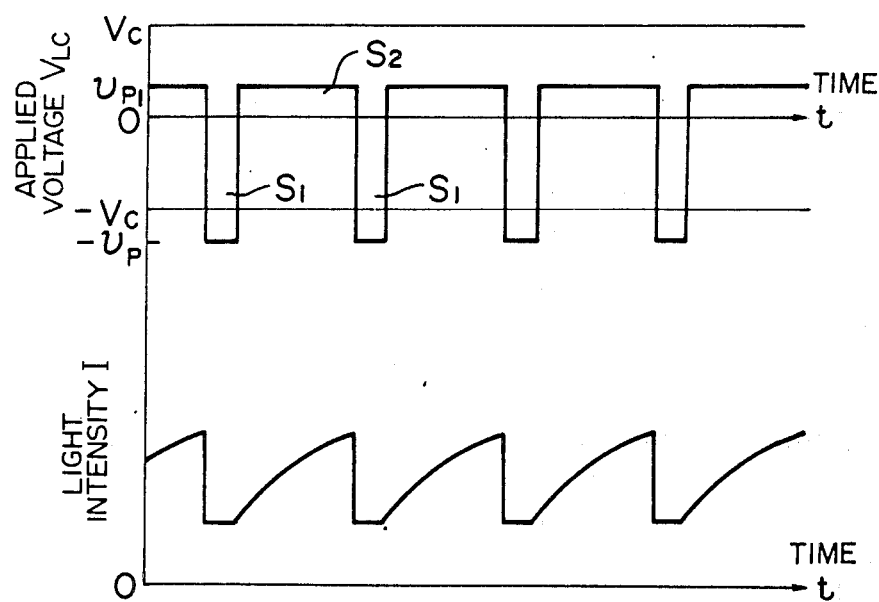

FIG. 10 shows driving waveforms illustrative of a second embodiment of the present invention, with FIG. 10(a) showing a bright display and FIG. 10(b) showing a dark display.

Being different from the first embodiment of FIG. 7, the embodiment in FIG. 10 is so constructed that an additional inverting pulse voltage for zeroing the DC component of the voltage applied to the ferroelectric liquid crystal has a pulse height $v_{p1}$ which is lower than the threshold voltage Vc and a pulse width which is widened correspondingly. Then, in order to zero the DC component, a DC component $S_1$ of a positive pulse has an opposite polarity to and the same absolute value as those of a DC component $S_2$ of a negative pulse, as indicated by equation (1):

$$S_1 = -S_2 \qquad (1)$$

Since, in this embodiment, the voltage applied to the ferroelectric liquid crystal is also zeroed in average to eliminate the DC component, the deterioration of the ferroelectric liquid crystal can be prevented and a desired light transmission state can be obtained at a high speed.

In addition, the pulse voltage for zeroing the DC component has the pulse height which is lower than the threshold voltage Vc of the ferroelectric liquid crystal, thereby ensuring that the contrast ratio can be increased as compared to the first embodiment.

Figure 11:
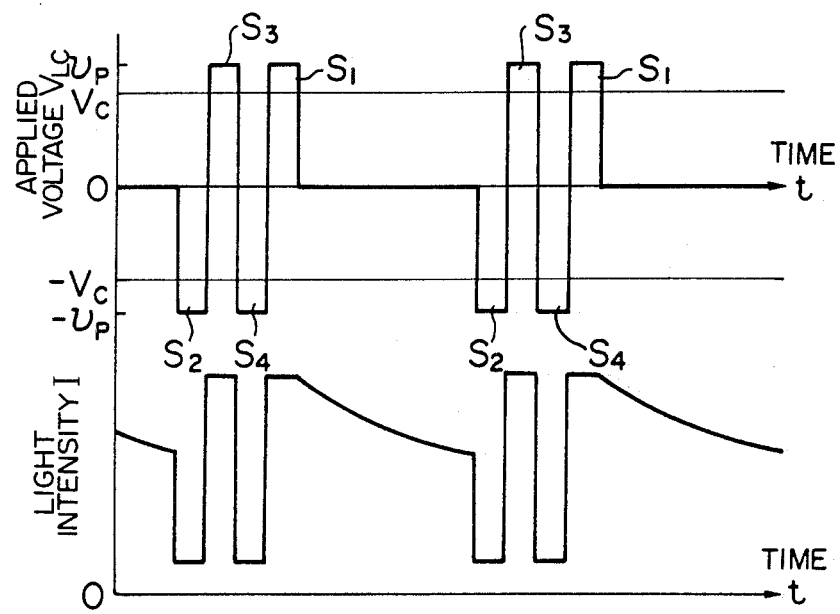
Figure 11:
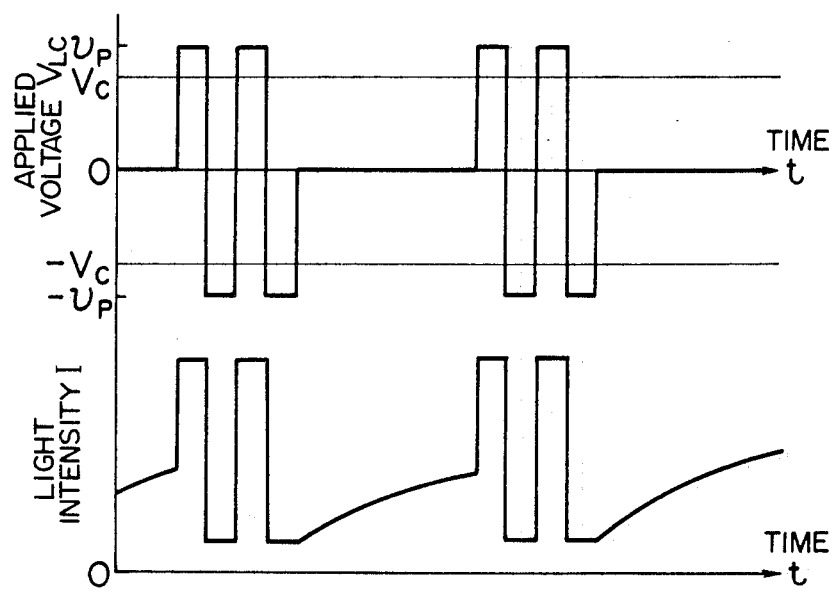

FIG. 11 shows driving waveforms illustrative of a third embodiment of the present invention, with FIG. 11(a) showing a bright display and FIG. 11(b) showing a dark display.

In FIG. 11, a DC component $S_1$ of the pulse voltage for determining a light transmission state of the liquid crystal device is also related to a DC component $(S_2+S_3+S_4)$ of the other voltage signals in the opposite polarity and the same absolute value relationship, as indicated by equation (2):

$$S_1 = -(S_2+S_3+S_4) \qquad (2)$$

Figure 12:
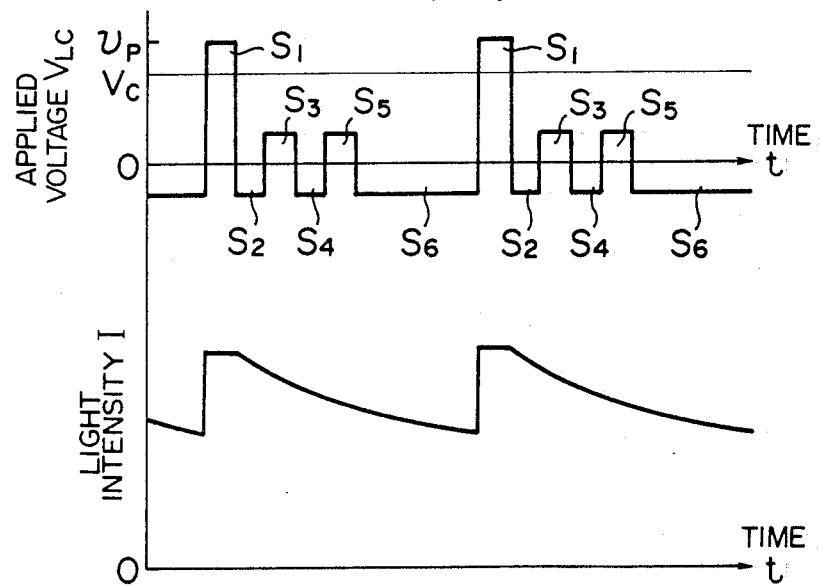
Figure 12:
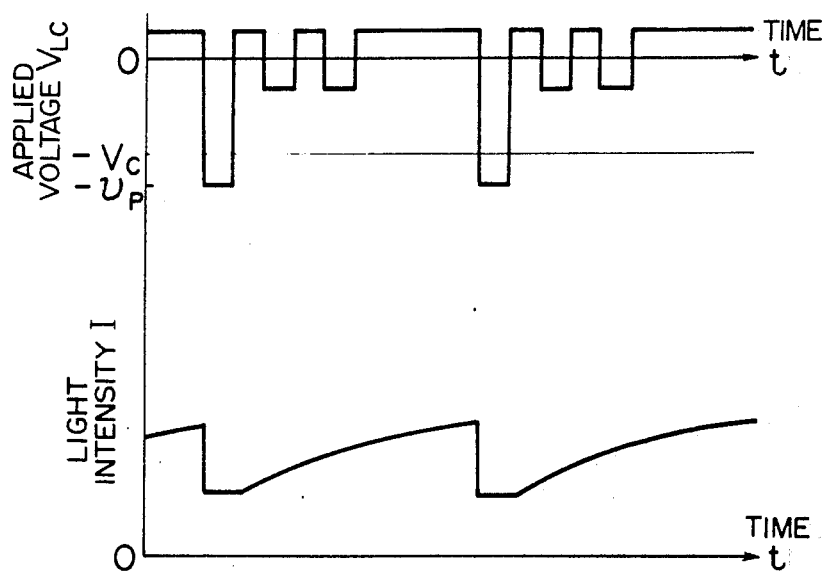

FIG. 12 shows driving waveforms illustrative of a fourth embodiment of the present invention, with FIG. 12(a) showing a bright display and FIG. 12(b) showing a dark display.

In FIG. 12, a DC component $S_1$ of the pulse voltage for determining a light transmission state of the liquid crystal device is also related to a DC component $(S_2+S_3+S_4+S_5+S_6)$ of the other voltage signals in the opposite polarity and the same absolute value relationship, as indicated by equation (3):

$$S_1 = -(S_2+S_3+S_4+S_5+S_6) \qquad (3).$$

Figure 13:
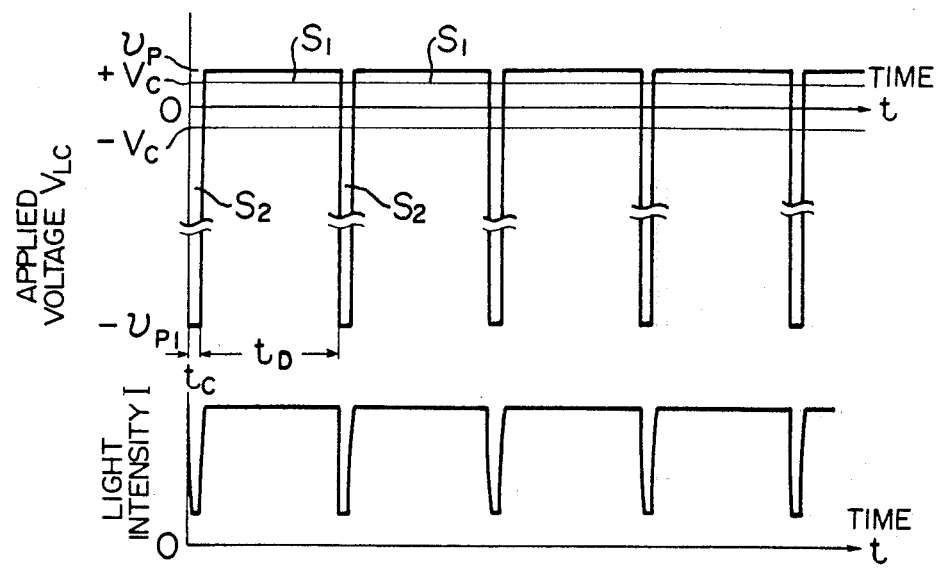
Figure 13:
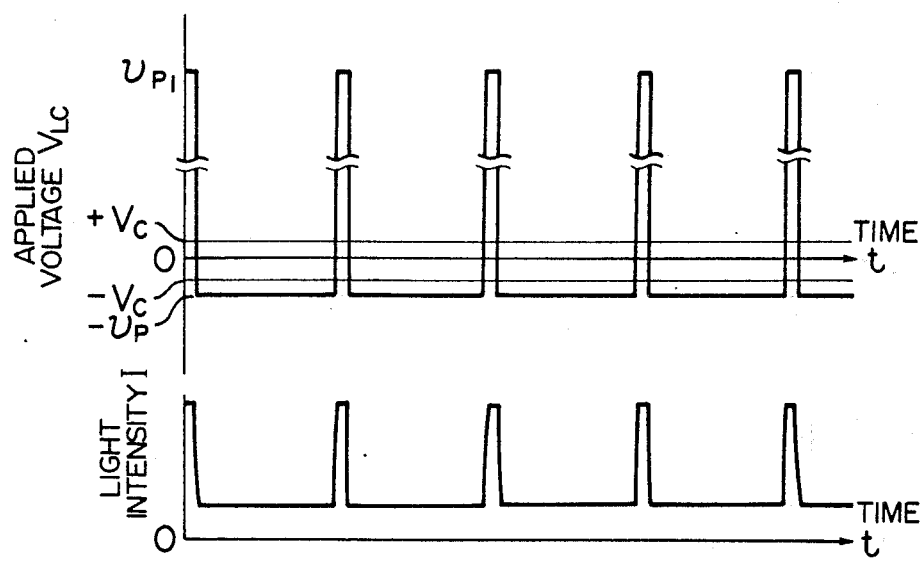

FIG. 13 shows driving waveforms illustrative of a fifth embodiment of the present invention, with FIG. 13(a) showing a bright display and FIG. 13(b) showing a dark display.

In FIG. 13, a DC component $S_1$ of the pulse voltage for determining a light transmission state of the liquid crystal device is also related to a DC component $S_2$ of the other voltage signals in the opposite polarity and the same absolute value relationship as indicated in the equation (1).

In this embodiment, not only the same effects as in the foregoing embodiments can be attained but also the contrast ratio can be increased since a time interval $t_D$ during which the pulse voltage for determining the light transmission state is applied is sufficiently longer than a time interval $t_c$ during which the pulse voltage for zeroing the DC component is applied.

While, in the first to fifth embodiments of the present invention described previously, the polarizing axis direction 911 of the polarizing plate 91 has been coincident with the direction of helical axis 2 of the ferroelectric liquid crystal molecules under the application of the electric field $-V$, it may be coincident with the direction of helical axis 2 of the ferroelectric liquid crystal molecules under the application of the electric field V whereby the bright and dark displays in the first to fifth embodiments may be reversed.

Further, in the first to fifth embodiments, the voltage signal for zeroing the DC component has been applied immediately before and after the application of the pulse voltage for determining the light transmission state of the liquid crystal device but this is not limitative and the voltage signal may be applied at any times within the period during which the pulse voltage for determining the light transmission state is applied.

Figure 14:
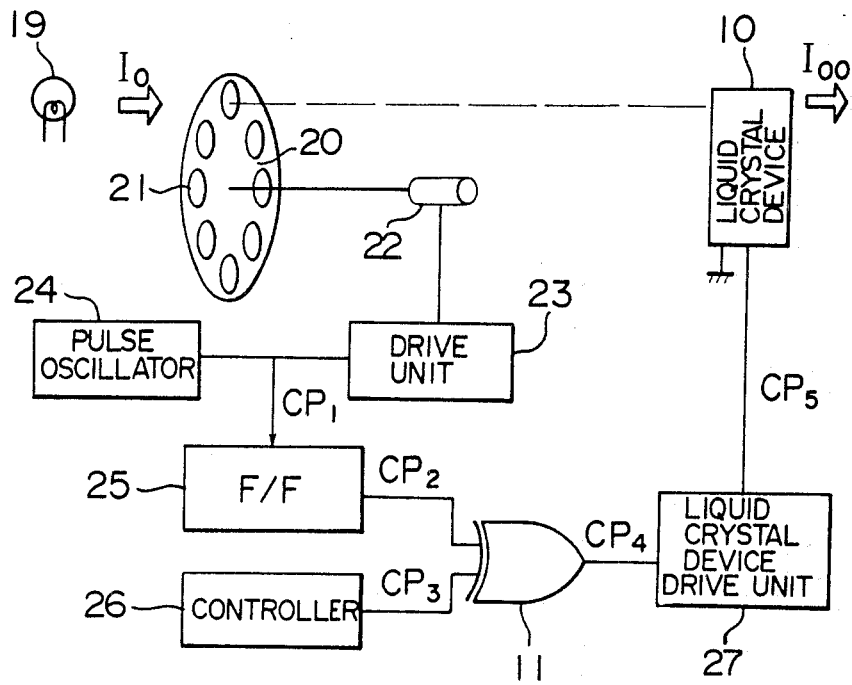

FIG. 14 shows a typical implementation of the first system (FIG. 6 embodiment) according to the present invention.

The liquid crystal device 10 is with the construction shown in FIG. 2. The alignment control layer 5 is polyimid-iso-indolylquinazolinedione layer and the electrode 4 is a transparent electrode of indium oxide. The substrate 3 is a glass substrate and the alignment control layer 5 has a surface pattern oriented in a predetermined direction by rubbing. The two substrates 3 are put together through a sealing agent 7 including a spacer of 6 μm diameter glass fibers such that the upper and lower rubbing directions are anti-parallel to each other. The ferroelectric liquid crystal substance is DOBANBC, which is vacuum sealed into the liquid crystal device. After sealing, the DOBANBC is once heated to an isotropic liquid temperature and thereafter cooled gradually at a rate of 1° C./min until a liquid phase, thereby aligning the liquid crystal molecules uniformly. The thus completed liquid crystal device 10 is applied with the polarizing plates 91 and 92. In this embodiment, Polaroid HN-38 is used as the polarizing plate.

In order to align the helical axis of the liquid crystal in a priority orientation parallel to the substrate surface, are method is to gradually cool, under the application of an intensive magnetic field, the liquid crystal in an isotropic liquid state until it undergoes phase transition into a liquid phase, and another method is to apply shearing stress to the liquid crystal. These methods are, however, impractical. A rubbing method wherein an organic or inorganic thin layer is rubbed with cloths in a predetermined direction is practical and has been used widely to uniformly align nematic liquid crystal molecules. However, liquid crystal compounds exhibiting ferroelectric properties are concerned, uniform alignment of molecules is generally difficult to obtain as compared to nematic liquid crystal molecules, and not all layers effective for the nematic liquid crystal are applicable. Todays, however, some kinds of organic films of polyimide type have been found effective for obtaining a uniform alignment. In rubbing, rubbing directions for the two substrates are selected to be antiparallel to each other.

Figure 15:
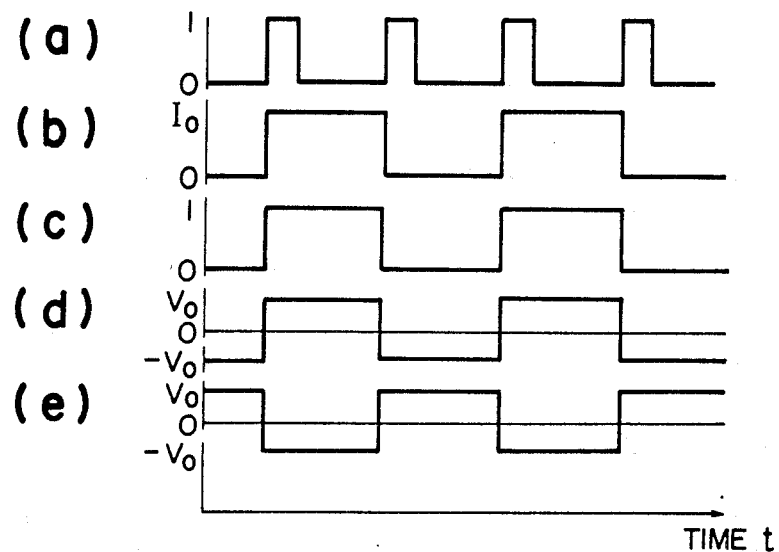
FIG. 15 is a diagram illustrative of pulse voltages used in the embodiment of FIG. 14.

A chopper 20 is arranged between a liquid crystal device 10 and a light source 19. In this embodiment, a rotary disc having eight light transmission ports 21 formed at equidistance is used as the chopper 20. The light transmission port 21 has a diameter which is equal to a distance between adjacent light transmission ports 21. The chopper 20 is driven by a pulse motor 22 which in turn is driven by a drive unit 23. A pulse oscillator 24 generates a clock pulse $CP_1$ which is applied to the drive unit 23 and a flip-flop circuit 25. A controller 26 generates a clock pulse $CP_3$ and clock pulses $CP_2$ and $CP_3$ respectively produced from the flip-flop circuit 25 and the controller 26 are supplied to an exclusive "or" gate 11. A clock pulse $CP_4$ delivered out of the exclusive "or" gate 11 is applied to a liquid crystal device drive unit 27 and then sent, as a clock pulse $CP_5$, to the liquid crystal device 10. The clock pulses $CP_1$, $CP_2$ and $CP_5$ are related to each other as shown in FIG. 15, which FIG. 15(a) showing the clock pulse $CP_1$, FIG. 15(b) showing light passing through the chopper, FIG. 15(c) showing the clock pulse $CP_2$, FIG. 15(d) showing an ON (light transmission) state caused by the clock pulse $CP_5$, and FIG. 15(e) showing an OFF (light blocking) state caused by the clock pulse $CP_5$. In addition the relation between the transmission light and the clock pulses $CP_2$, $CP_3$, $CP_4$ and $CP_5$ is indicated in Table 3. In this manner, the chopper 20 intermittently blocks incoming light from the light source 10 to the liquid crystal device 10.

TABLE 3

| Transmission light | $CP_3$ | $CP_2$ | $CP_4$ | $CP_5$ |
|---|---|---|---|---|
| ON | 0 | 0 | 0 | $-V_o$ |
| (Transmission) | | 1 | 1 | $+V_o$ |
| OFF | 1 | 0 | 1 | $+V_o$ |
| (Blocking) | | 1 | 0 | $-V_o$ |

Figure 16:
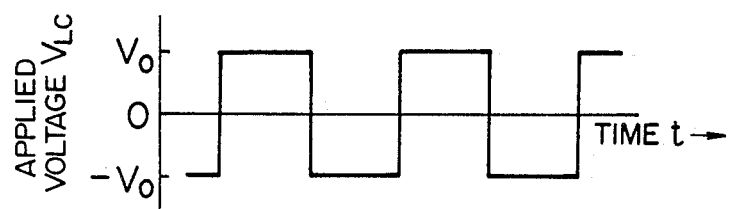
Figure 16:
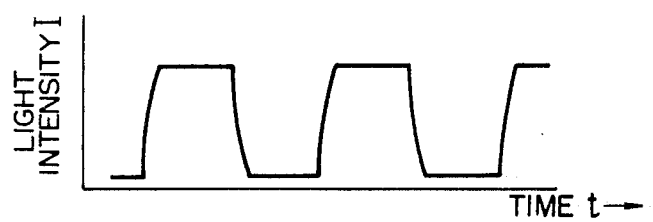
Figure 17:
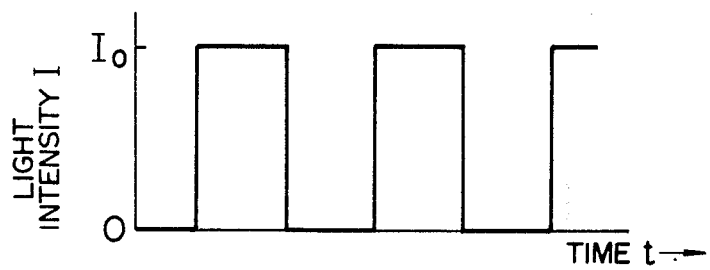
FIG. 17 is a diagram illustrative of a characteristic of a chopper used in the embodiment of FIG. 14.
Figure 18:
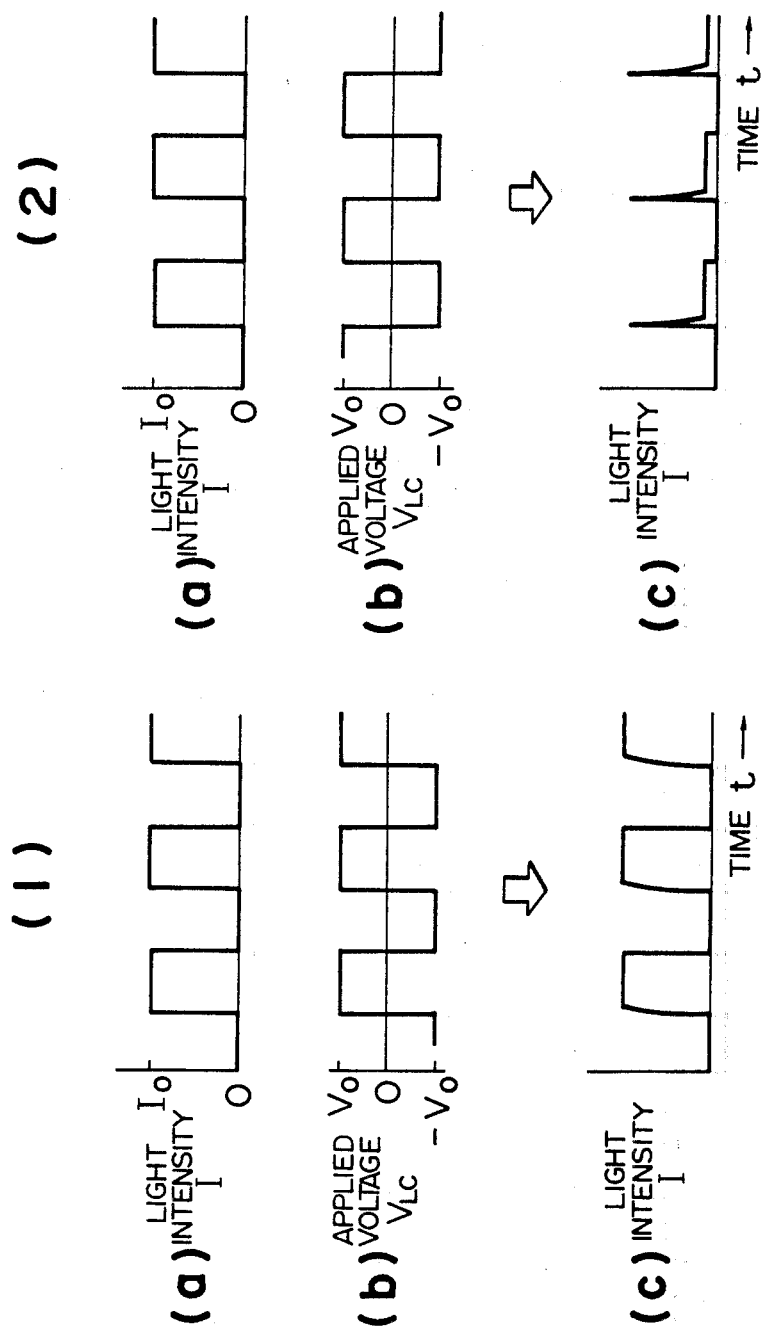
FIG. 18 is a diagram illustrative of the principle of driving in the embodiment of FIG. 14.

When an alternating rectangular waveform as shown in FIG. 16(a) is applied to the optical device of the above construction, light of fixed intensity incident to the liquid crystal device 10 is modulated as shown in FIG. 16(b). The chopper 20 shown in FIG. 14 acts to intermittently block the fixed intensity light as shown in FIG. 17. Referring now to FIG. 18, the manner of modulating light of fixed intensity $I_o$ from the light source 19 by passing through the chopper 20 and liquid crystal device 10 arranged as shown in FIG. 14 will be described. FIG. 18(1) illustrates an ON state or transmission state and FIG. 18(2) illustrates an OFF state or blocking state. FIGS. 18(1)-(a) and 18(2)-(a) illustrate intensity of light passing through the chopper, FIGS. 18(1)-(b) and 18(2)-(b) illustrate a voltage waveform applied to the liquid crystal device, and FIGS. 18(1)-(c) and 18(2)-(c) illustrate intensity I of light ultimately obtained.

As shown in FIG. 18(1), when a positive electric field (which increases the quantity of light passing through the liquid crystal device) is applied in synchronism with the passage of light through the chopper 20 and a negative electric field is applied in synchronism with the blocking of light, intensity I of ultimate transmission light as shown in FIG. 18(1)-(c) is obtained. Conversely, when the sign of the electric field is inverted as shown in FIG. 18(2), intensity I of ultimate light as shown in FIG. 18(2)-(c) is obtained. When comparing both of ultimate light intensity I, it will clearly be seen that bright and dark contrast is established, thus providing the function of optical switch. With the construction of FIG. 14, therefore, the liquid crystal device utilizing the liquid crystal with ferroelectric properties can be driven by the alternating voltage as shown in FIG. 18(1)-(b) or 18(2)-(b) so as to switch the light.

Figure 19:
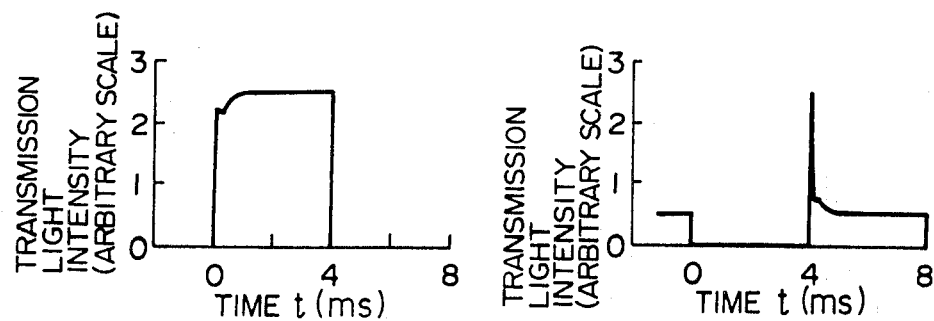

At a temperature of 75° C. at which the liquid crystal exhibits the ferroelectric properties, waveforms of the transmission light were observed. Characteristic curves representative of observed waveforms are illustrated in FIG. 19. In this case, a contrast ratio of 4.8:1 was obtained between ON and OFF displays.

Figure 20:
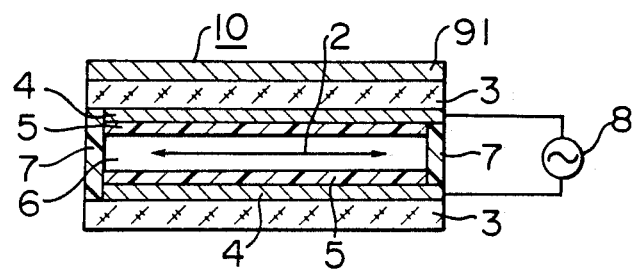

FIG. 20 shows a seventh embodiment of the present invention which is different from the FIG. 6 embodiment in that (1) the liquid crystal layer contained a dichroic dye, and (2) a single polarizing plate is provided on one side of the device. The dichroic dye is 1,4-diamino-2-(p-m-butylphenoxycarbonyl) anthraquinone and mixed with the liquid crystal (DOBANBC) at 3 wt %. The polarizing axis of the polarizing plate is displaced about 20° from the rubbing direction. Excepting the above points, construction and preparation methods involved in the seventh embodiment are similar to those involved in the sixth embodiment.

Figure 21:
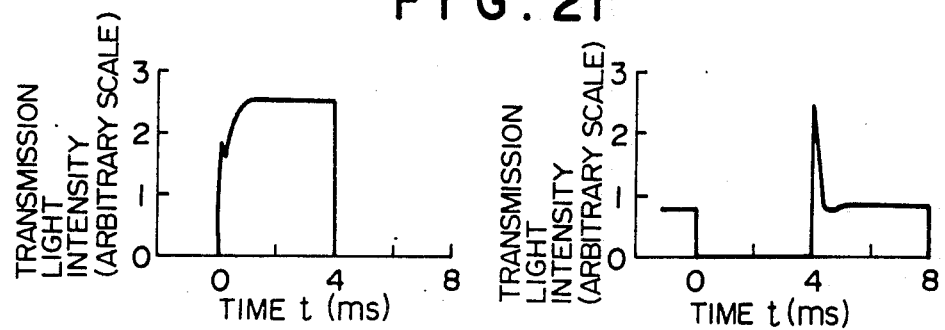

Similar to the sixth embodiment, the transmission light was measured at 75° C. to obtain transmission light waveforms as shown in FIG. 21. In this embodiemnt, a contrast ratio of 26:1 was obtained.

To provide dichroic properties, the aforementioned compound is usually added with a small amount (about several %) of dichroic dye. For use in liquid crystal displays, various kinds of synthesized dichroic dye are available. Typically, the dichroic dye of azo type, azomethine type, anthraquinone type, quinophtalein type is available and one kind or a mixture of two or more kinds, of the dichroic dye is used for the liquid crystal device.

FIG. 22 shows an eight embodiment of the present invention. According to this embodiment, one liquid crystal device 10 as shown in FIG. 2 and the other liquid crystal device 10 as shown in FIG. 20 are mated together in such a manner that rubbing directions in the respective devices are aligned in parallel. With a view of adapting this embodiment for an optical switch for use in a printer, bright and dark states are switched by a clock pulse $CP_2$. A signal generator 28 generates a control signal. An electronic switch 29 has two input terminals a and b which are connected to a pulse oscillator 24. The pulse oscillator 24 generates a clock pulse $CP_1$. This clock pulse $CP_1$ is directly applied to the terminal a and to the terminal b via an inverter 25. Accordingly, the terminal b receives a clock pulse $\overline{CP}_1$ via the inverter 25. The clock pulses $CP_1$ and $CP_2$ are related to each other as shown in FIG. 23, with FIG. 23(a) showing the clock pulse $CP_1$ and FIG. 23(b) showing the clock pulse $\overline{CP}_1$.

The two liquid crystal devices 10 were driven to measure waveforms of transmission light in accordance with ON state and OFF state under the same conditions for the sixth embodiment. Results are illsutrated in FIG. 23. The ON and OFF states can be established by switching the connection in the electronic switch 29 in response to $CP_2$. The states of transmission light according to switchover of the electronic switch are cleared up in Table 4.

TABLE 4

| CP$_2$ | Switch | Transmission light |
| --- | --- | --- |
| 0 | a | ON (Transmission) |
| 1 | b | OFF (Blocking) |

When the electronic switch 29 is transferred to the terminal a, the two liquid crystal devices 10 are applied with CP$_1$ (electric field) and transmission light takes a waveform as shown in a lefthand diagram of FIG. 24 (ON state). On the other hand, when the electronic switch 29 is transferred to the terminal b, one liquid crystal device 10 is applied with CP$_1$ (electric field) and the other liquid crystal device 10 is applied with $\overline{CP}_1$ (electric field) and transmission light takes a waveform as shown in a righthand diagram of FIG. 24 (OFF state). The waveforms of transmission light shown in FIG. 24 were obtained when an alternating rectangular waveform of 15 V at 100 Hz was used for the electric field CP$_1$. In this case, a contrast ratio of 2.5:1 was obtained. As will be understood from the principle, when two liquid crystal devices 10 are used, four polarizing plates are not always necessary and three polarizing plates suffice.

With the overlapped structure of liquid crystal devices according to this embodiment, the unitary liquid crystal device can be very thin so that a fabricated optical switch can be compact and thin as compared to the optical switch utilizing the chopper in the form of a rotary disc. In comparison with the display device, the optical switch is not so critical to flicker.

Figure 25:
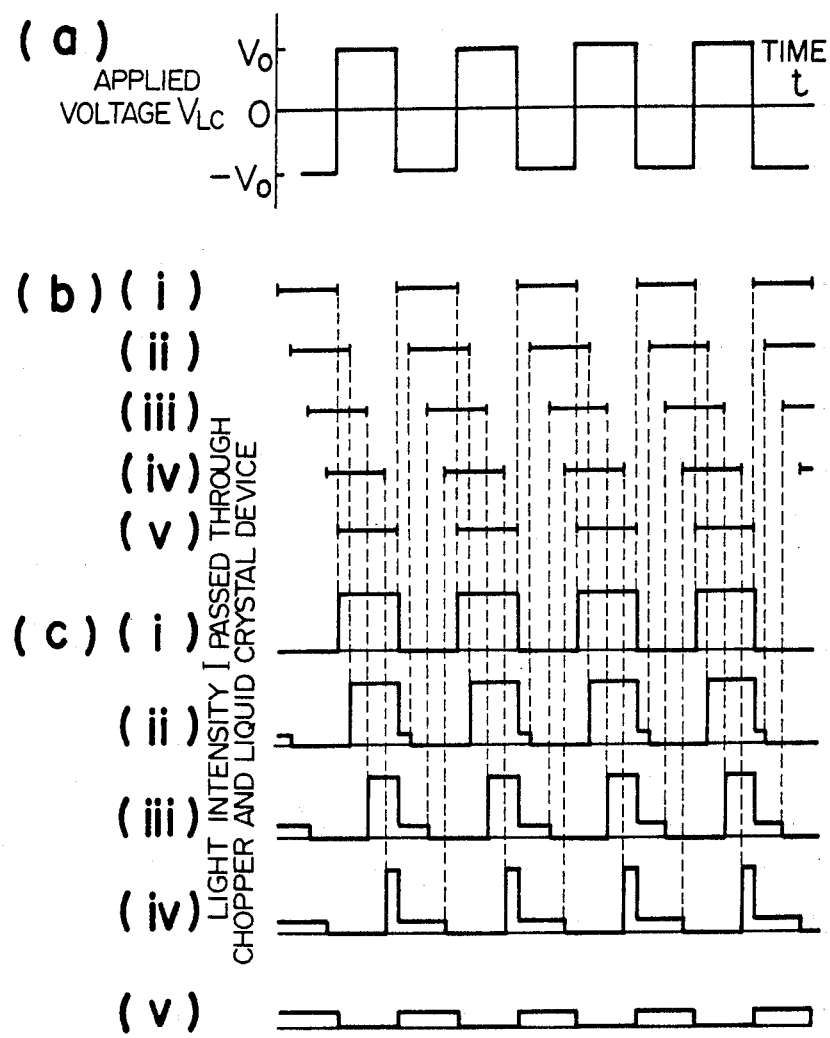
FIG. 25 is a diagram showing driving waveforms used for tonal displays in the embodiment of the optical device according to the present invention.

FIG. 25 is illustrative of an application (ninth embodiment) of the sixth to eight embodiments to tonal displays. In FIG. 25, sections (i) to (V) show patterns for driving the chopper, wherein the timing for light to pass through the chopper coincides with the timing for applying a positive electric field Vo in section (i), and the timing for light to pass through the chopper coincides with the timing for applying a negative electric field —Vo in section (V). In sections (ii) to (iv), intermediate states are established stepwise, whereby in each step, the timing for light to pass through the chopper partly overlaps the timing for the positive electric field Vo. FIG. 25(a) shows an applied voltage and FIG. 25(b) shows the timing for transmission light, where solid line parts and gaps therebetween in FIG. 25(b) are representative of the light blocking timing and the light transmission timing, respectively. FIG. 25(c) shows intensity of light issuing from the chopper. It will be appreciated from FIG. 25 that as the pattern shifts from (i) to (v), the state of brightness shifts stepwise toward a dark state. In this manner, the present invention assures tonal displays.

As has been described, according to the present invention, high contrast can advantageously be obtained even when the intensity of light issuing from the optical element is reversed in magnitude in response to inversion of the polarity of the external field applied to the optically functional material.

We claim:

1. An optical apparatus comprising an optical device having an optically functional material sandwiched between a pair of substrates with electrodes formed on opposing surfaces, said optically functional material having such a characteristic that intensity of light emitted from said optical device changes asymmetrically in response to inversion of the polarity of an applied external field, wherein first means for applying to said optically functional material pulse voltages of one polarity for determining the intensity of the emitted light and pulse voltages of an opposite polarity at a predetermined period so that an average voltage is zeroed within the predetermined period, and second means for selecting or changing said emitted light intensity under the application of the pulse voltages of one polarity and said emitted light intensity under the application of the other pulse voltages.

2. An optical apparatus according to claim 1, wherein said optically functional material comprises ferroelectric liquid crystal.

3. An optical apparatus according to claim 2, wherein said optical device comprises a light transmission type device.

4. An optical apparatus according to claim 3, wherein said optically functional material comprises ferroelectric liquid crystal.

5. An optical apparatus according to claim 1, wherein said second means comprises a unit arranged on a path of light passing through said optical device and having a function to intermittently block the light, and the intermittent blocking of light is synchronized with the application of said pulse voltages.

6. An optical apparatus according to claim 5, wherein said optically functional material comprises ferroelectric liquid crystal.

7. An optical apparatus according to claim 5, wherein said optical device comprises a light transmission type device.

8. An optical apparatus according to claim 7, wherein said chopper comprises a pleochroic ferroelectric liquid crystal device.

9. An optical device according to claim 7, wherein said chopper comprises a rotary member formed with light transmission ports.

10. An optical apparatus according to claim 7, wherein said optically functional material comprises ferroelectric liquid crystal.

11. An optical apparatus according to claim 1, wherein said first means comprises means for making sufficiently shorter an application time interval of said pulse voltages of one polarity than that of said pulse voltages of an opposite polarity signal within said predetermined period and for making sufficiently larger an absolute value of a pulse height of said pulse voltage than that of said voltage signal.

12. An optical apparatus according to claim 11, wherein said optically functional material comprises ferroelectric liquid crystal.

13. An optical apparatus according to claim 12, wherein said chopper synchronizes the application of said pulse voltages of one polarity with the passage of light to establish a bright state of transmission light and synchronizes the application of said pulse voltages of one polarity with the intermittent blocking of the light path to establish a dark state of transmission light, thereby switching the bright and dark states.

14. An optical apparatus according to claim 12, wherein said chopper synchronizes the timing for the application of said pulse voltage of one polarity and the timing for the passage of light in said a manner that these timings partly overlap, thereby providing a tonal state of transmission light issuing from said optical device.

15. An optical apparatus according to claim 12, wherein said chopper comprises a pleochroic ferroelectric liquid crystal device.

16. An optical device according to claim 12, wherein said chopper comprises a rotary member formed with light transmission ports.

17. An optical apparatus according to claim 12, wherein said optically functional material comprises ferroelectric liquid crystal.

18. An optical apparatus according to claim 11, wherein said optical device comprises a light transmission type device.

19. An optical apparatus according to claim 18, wherein said optically functional material comprises ferroelectric liquid crystal.

20. An optical apparatus according to claim 1, wherein said optical device comprises a light transmission type device.

21. An optical device according to claim 20, wherein said chopper comprises a rotary member formed with light transmission ports.

22. An optical apparatus according to claim 20, wherein said optically functional material comprises ferroelectric liquid crystal.

23. An optical apparatus according to claim 20, wherein said chopper comprises a pleochroic ferroelectric liquid crystal device.

24. In an optical apparatus comprising an optical device having an optically functional material sandwiched between a pair of substrates with electrodes formed on opposing surfaces, said optically functional material having such a characteristic that intensity of light issuing from the optical device changes asymmetrically in response to inversion of the polarity of an applied external field, the improvement which comprises:
first means for applying to said optically functional material pulse voltages of one polarity for determining the intensity of the issuing light and pulse voltages of an opposite polarity at a predetermined period so that an average voltage is zeroed within the predetermined period; and
a chopper arranged on a path of light passing through said optical device and having a function to intermittently block the light and to synchronize the intermittent blocking of light with the application of said pulse voltages of one polarity.

25. An optical apparatus according to claim 24, wherein said ferroelectric liquid crystal is so aligned that its helical axis direction is aligned in a priority direction which is substantially parallel to the surface of each of said substrates.

* * * * *